United States Patent [19]

Joonishi et al.

[11] Patent Number: 4,829,456
[45] Date of Patent: May 9, 1989

[54] THREE-DIMENSIONAL SURFACE DISPLAY METHOD

[75] Inventors: Hirofumi Joonishi, Hachioji; Akio Yajima, Tokyo, both of Japan

[73] Assignee: Hitachi, Ltd., Tokyo, Japan

[21] Appl. No.: 869,988

[22] Filed: Jun. 3, 1986

[30] Foreign Application Priority Data

Jun. 7, 1985 [JP] Japan .................................. 60-122428
Jun. 14, 1985 [JP] Japan .................................. 60-128121

[51] Int. Cl.$^4$ .............................................. G06F 3/153
[52] U.S. Cl. ...................................... 364/522; 364/521
[58] Field of Search ............... 364/518, 521, 520, 522, 364/523, 191; 340/727, 729, 747, 724, 734

[56] References Cited

U.S. PATENT DOCUMENTS 4,491,906 1/1985 Kishi et al. ........................... 364/191
4,523,270 6/1985 Kishi et al. ........................... 364/191

OTHER PUBLICATIONS

Computational Techniques for Processing Parametric Surfaces-Kopaikai et al., Comp. Vision, Graphics and Image Processing 28, 303-320, 1984.
Local Invariants and Twist Vectors in Computer Aided Geometric Design Selesnick-CGIP 17, pp. 147-160 (1981).
Discrete B-Splines and Subdivision Techniques in Computer Aided Design and Computer Graphic-Cohen et al. CGIP 14, pp. 87-111 (1980).
Gasson P. C., "Geometry of Spatial Forms" John Wiley & Sons Limited-pp. 483-505-1983.

Primary Examiner—Gary V. Harkcom
Assistant Examiner—Phu K. Nguyen
Attorney, Agent, or Firm—Antonelli, Terry & Wands

[57] ABSTRACT

The characteristic curve is moved only along the first control curve, and the resultant curve is subjected to a rotation and a homothetic deformation keeping the similarity, thereby generating an intermediate curve having the ends located on the first and second control curves. A plurality of such intermediate curves can be generated by executing this operation with various values of distances by which the characteristic curve is moved. Data associated with the surface to be generated is obtained from the group of the intermediate curves and is then subjected to a perspective transformation for projecting data onto a desired two-dimensional screen; as a result, the generated data is displayed on a display unit.

20 Claims, 8 Drawing Sheets

THREE-DIMENSIONAL SURFACE DISPLAY METHOD

BACKGROUND OF THE INVENTION

The present invention relates to a method for displaying a three-dimensional surface.

Recently, it has been a common practice to display a three-dimensional surface on a two-dimensional screen of a graphic display unit.

In a prior art method, a curve (to be referred to as a characteristic curve herebelow) representing an edge constituting a three-dimensional surface to be generated is moved by various distances along two curves (to be referred to as control curves herebelow) enclosing the characteristic curve so as to obtain a plurality of curves (intermediate curves) to be found on the surface, thereby displaying the three-dimensional surface with the intermediate curves.

For example, according to the interpolation proposed by Coons (Massachusetts Institute of Technology, Project MAC Technical Report, MAC-TR-41 (1967. 6), intermediate curves are generated only by effecting the parallel displacement and blending of the characteristic curve.

The characteristic curve is independently moved along the first control curve and a second control curve, respectively to generate two intermediate curves, which are then blended to be an intermediate curve linking the two control curves. That is, the characteristic curve is parallelly moved along the first control curve with an end of the characteristic curve kept stayed on the first control curve, which generates the first intermediate curve. Similarly, the characteristic curve is moved along the second control curve with an end thereof kept stayed on the second control curve so as to generate the second intermediate curve. As a consequence, although an end of the first intermediate curve and an end of the second intermediate curve exist on the first and second control curves, respectively; the other ends of the first and second intermediate curves are not found on the first and second control curves. A weighted mean of these two intermediate curves are calculated, or these lines are blended, by use of an appropriate weight function, thereby attaining an intermediate curve having the ends on the first and second control curves, respectively.

In this method, however, ① the intermediate curves can be generated only by parallelly moving a characteristic curve, and hence the kinds of intermediate curves to be generated are limited; furthermore, ② the first and second intermediate curves are independently generated, which causes the intermediate curves to be changed according to the blended values; and hence the intermediate curves often include undulated portions. Consequently, the surface represented by use of these intermediate curves also contains such undulated portions. Due to the drawbacks, the interpolation method proposed by Coons can only be applied to a situation where only small surface patches are generated; and a great amount of point series data is required to be inputted when generating a large surface, for example, of an outer surface of an industrial product.

To remove the first disadvantageous feature of the Coons' method, there has been known a method in which such operations as rotation, enlargement, and shrinkage are applied to the characteristic curve in addition to the parallel displacement (Proceedings of Nat. Conv. IECE Japan (1977), Vol. 5, p. 294; Proceedings of 29th Nat. Conv. of the Information Processing Society of Japan, Vol. 5, pp. 1749–1750). In this method, however, a characteristic curve is independently moved along the first and second control curves, so that an intermediate curve is generated by blending the resultant curves; however, the second drawback item identified above, namely, the undulation of the surface is not removed.

In addition, according to the Japanese patent unexamined publication No. 57-5109, the control and characteristic curves each are limited to a plane curve; consequently the kinds of the curves to be generated are restricted.

SUMMARY OF THE INVENTION

It is therefore an object of the present invention to provide a method for generating and displaying a large surface having few undulated portions based on two control curves and at least a characteristic curve.

To this end, according to the present invention, the characteristic curve is moved only along the first control curve, and the resultant curve is subjected to a rotation and a homothetic deformation keeping the similarity, thereby generating an intermediate curve having the ends located on the first and second control curves. A plurality of such intermediate curves can be generated by executing this operation with various values of distances by which the characteristic curve is moved. Data associated with the surface to be generated is obtained from the group of the intermediate curves and is then subjected to a perspective transformation for projecting data onto a desired two-dimensional screen; as a result, the generated data is displayed on a display unit.

BRIEF DESCRIPTION OF THE DRAWINGS

The present invention will be apparent from the following detailed description taken in conjunction with the accompanying drawings in which.

DESCRIPTION OF THE PREFERRED EMBODIMENTS

Figure 1:
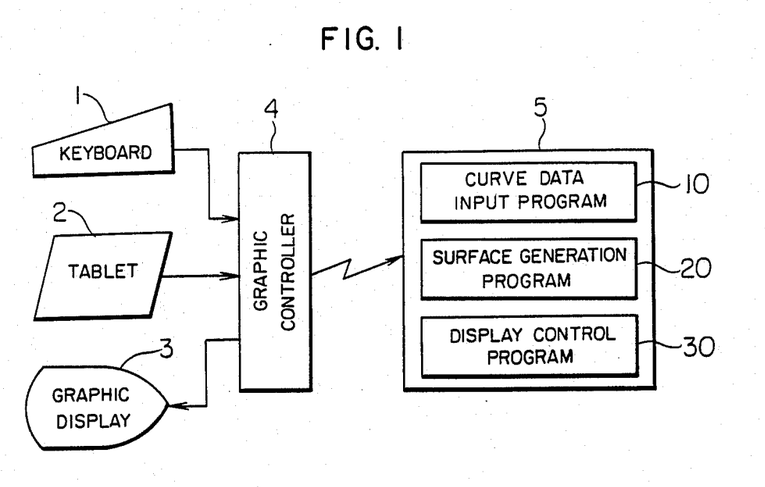
FIG. 1 is a schematic block diagram of a graphic processing system to which the present invention is applied.

FIG. 1 is a block diagram showing a graphic display system according to the present invention. The system includes a keyboard 1 for inputting data, a tablet 2 for inputting graphic data, a graphic display unit 3, a graphic controller 4 for controlling the keyboard 1, the tablet 2, and the graphic display unit 3, and a computer 5. For the units 1-4, apparatuses available in the market can be used.

A curve data input program 10, a surface generation program 20, and a display control program 30 are stored in the computer 5, wherein the surface generation program 20 is characteristic to the present invention.

Figure 2:
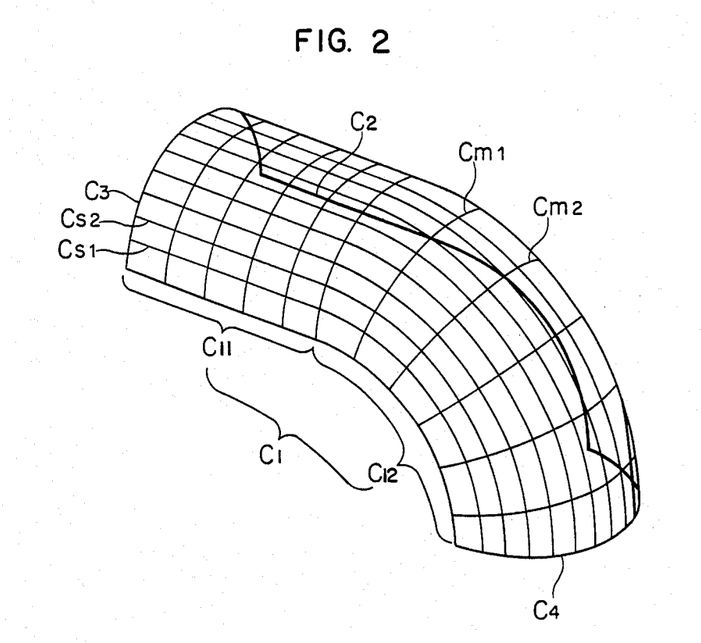
FIG. 2 is an example of a graphic image displayed by use of the system of FIG. 1.

According to the embodiment, a three-dimensional surface as instantiated in FIG. 2 is displayed as a two-dimensional graphic image on the graphic display unit 3.

In accordance with the present invention, boundary curves of the surface is inputted to generate data representing the surface. In the example of FIG. 2, the input data includes two curves $C_1$ and $C_2$ opposing to each other and a curve $C_3$. According to the present invention as described in detail later, a third edge curve $C_3$ is moved along the first and second curves $C_1$ and $C_2$ to generate various intermediate curves. In FIG. 2, curves $C_{m1}$-$C_{m2}$ are piecewise linear curves generated by linking the representative points on the associated intermediate curves, whereas curves $C_{s1}$-$s2$ are those generated by linking the representative points on the other associated intermediate curves. The curve $C_3$ to be moved and the curves $C_1$-$C_2$ guiding the curve $C_3$ are referred to as a characteristic curve and control curves, respectively herebelow. In this method, the remaining edge curve $C_4$ on the screen is generated as an intermediate curve. If the curve $C_4$ is desired to be specified as a predetermined curve, the curve $C_4$ need only be inputted as a second characteristic curve, so that an intermediate curve is generated also by use of the characteristic curve $C_4$ and is blended with the two intermediate curves generated from the curves $C_3$-$C_4$, thereby obtaining an intermediate curve. Note that the method for generating the intermediate curves is characteristic to the present invention.

Figure 3:
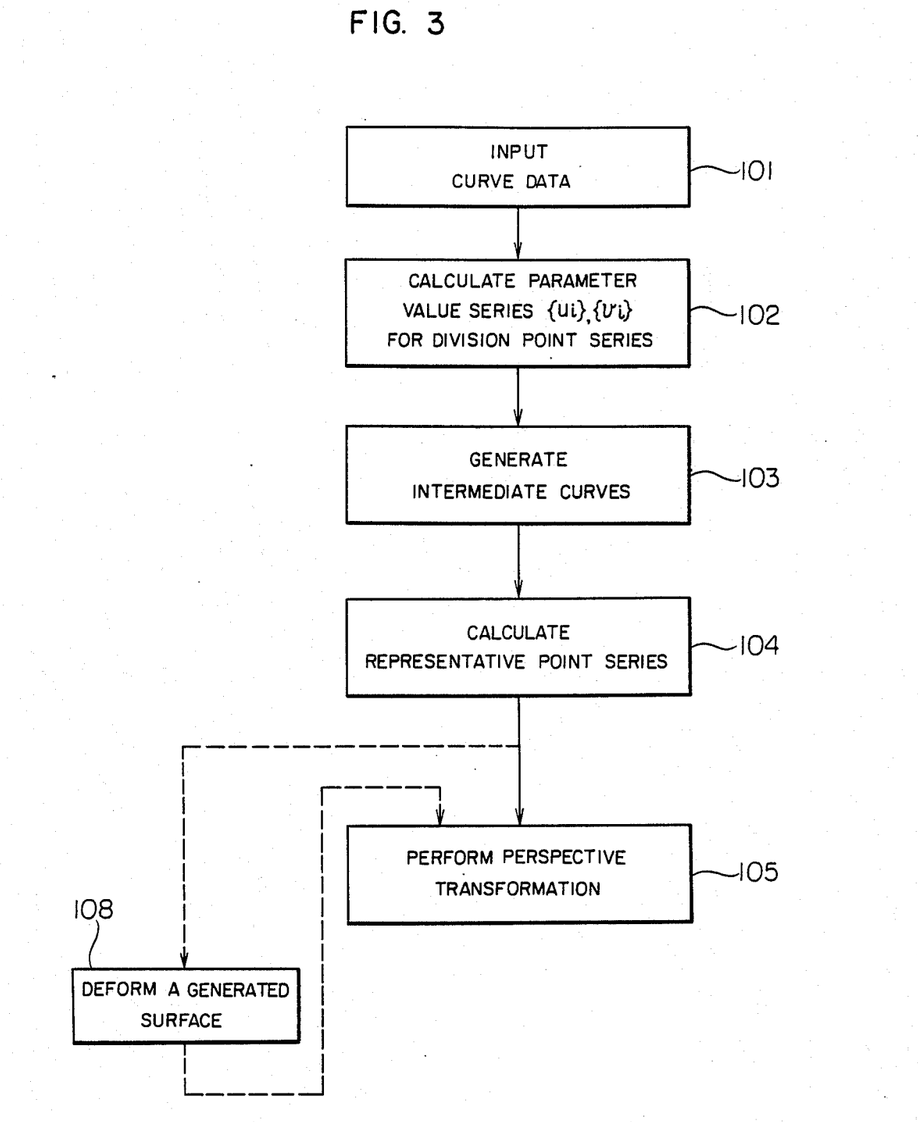
FIG. 3 is a flowchart of a processing flow for displaying a surface by use of the system of FIG. 1 according to the present invention.

Next, referring to the flowchart of FIG. 3, the surface display method of the present invention will be described.

Curve input processing (step 101)

In this step, curve data representing the characteristic and control curves of a surface to be displayed is inputted from the keyboard 1, the tablet 2 (FIG. 1), or other input units (not shown) and is stored in a curve data storage area (not shown) by the curve data input program 10. In the example of FIG. 2, the first and second control curves $C_1$-$C_2$ and a characteristic curve $C_3$ (or curves $C_3$-$C_4$) are inputted.

The control and characteristic curves each may be a straight line, a circle, an arc, a spline curve, or a curve generated by smoothly connecting these graphic components. When a curve is constituted from a plurality of curves, each component curve is referred to as a curve segment herebelow. For example, in the example of FIG. 2, the first control curve $C_1$ includes curve segments $C_{11}$ and $C_{12}$. For a straight line, the curve data comprises the three-dimensional coordinates of the ends thereof; whereas, for an arc, the curve data includes the three-dimensional coordinates of the ends and the middle point thereof. If a curve comprises a plurality of curve segments, a set of curve data is inputted for each curve segment. In the following processing, an expression of a curve or a coordinate of a point on the curve is represented by a function of two parameters u and v each having a value in an interval [0, 1]. For the first and second curves, u=0 and u=1, whereas, for the first and second characteristic curves, v=0 and v=1. The method for representing the curves in this manner has been known. As a result, a three-dimensional curve is represented by an expression with respect to the x, y, and z axes, for example, by use of $C_x(u,v)$, $C_y(u,v)$, and $C_z(u,v)$. The curve will be more simply represented as $C(u,v)$ hereinbelow. A point on the curve is also represented as $P(u,v)$ by use of the parameter u and v. Consequently, the coordinate points of the curve data are also inputted as a function of the parameter u and v in the curve input processing 101.

Figure 4:
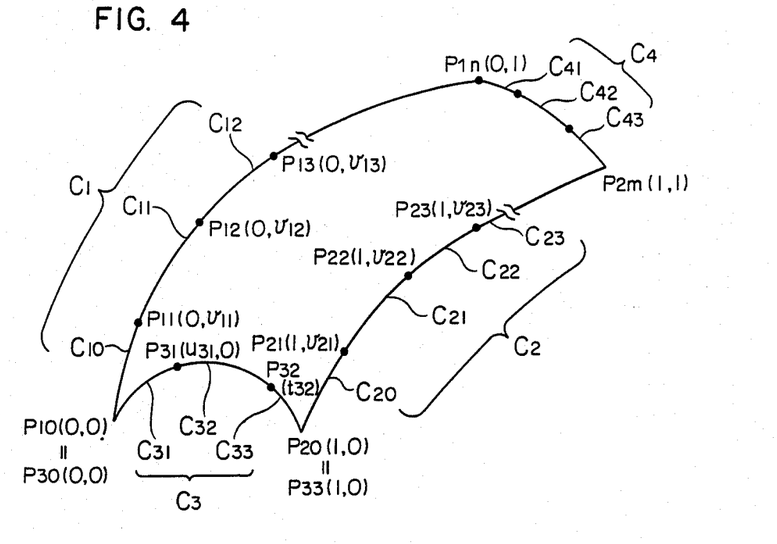
FIG. 4 is a schematic diagram illustrating an example of input graphic data.

FIG. 4 is a schematic diagram instantiating curves thus inputted. That is, a first control curve $C_1$ beginning at an end point $P_{10}(0,0)$ comprises curves $C_{10}$, $C_{11}$, $C_{12}$, . . . connected at connection points $P_{11}(0,v_{11})$, $P_{12}(0,v_{12})$, $P_{13}(0,v_{13})$, . . . and ends at an end point $P_{1n}(0,1)$; and a second control curve $C_2$ beginning from an end point $P_{20}(1,0)$ includes curves $C_{20}$, $C_{21}$, $C_{22}$, . . . connected at connection points $P_{21}(1,v_{21})$, $P_{22}(1,v_{22})$, $P_{23}(1,v_{23})$, . . . , and ends at an end point $P_{2m}(1,1)$. A characteristic curve $C_3$ beginning from an end point $P_{30}(0,0)$, identical to $P_{10}$, comprises curve segments $C_{31}$, $C_{32}$, and $C_{33}$ connected at connection points $P_{31}(u_{31},0)$ and $P_{32}(u_{32}, 0)$ and ends at an end point $P_{33}(1,0)$ identical to $P_{20}$. A characteristic curve $C_4$ is similarly constructed.

The second characteristic curve $C_4$ is inputted only when required.

Based on the curve data inputted as described above, the curve generation program 20 executes the following processing 102-104. Calculation of series of parameter values (u,v) for division point series (step 102)

In this step, the values of parameters u and v are calculated for a plurality of representative points on the surface to be displayed.

As will be described later, a representative point is defined by one of u parameter value series $\{u_i\}$ and one of v parameter value series $\{v_i\}$. This step calculates these parameter value series $\{u_i\}$ and $\{v_i\}$. In the following description, a point defined by the parameter value series $\{v_j\}$ on the curves $C_1$ and $C_2$ and a point defined by the parameter value series $\{u_i\}$ on the curves $C_3$ and $C_4$ are each referred to as a division point. In the step 102, the division points on the curves $C_1$-$C_2$ and those on the curves $C_3$-$C_4$ are determined to obtain the parameter value series $\{v_j\}$ and $\{u_i\}$. Basically, the number of division points are so selected as to achieve a smooth display of the surface.

Step 1: A sequence of numbers $A=\{v_{1i}\}$ $(0 \leq i \leq n_1)$ is generated in which the v parameter values $v_{1i}$ associated with the end point $P_{10}$ of the first control curve $C_1(u,v)$ and the connection points $P_{1i}(i=1 \sim n_1)$ of curve segments are arranged in the ascending order of the v parameter value.

Step 2: The same processing is accomplished also for the second control curve $C_2(1v)$ to generate a sequence $B=\{v_{2j}\}$ $(0 \leq j \leq n_2)$.

Step 3: The sequences $A=\{v_{1i}\}$ and $B=\{v_{2j}\}$ are merged so as to create a sequence of numbers $\{v_{12j}\}$ $(0 \leq j \leq n_3)$ in which the parameter values $v_{1j}$ and $v_{2j}$ are arranged in the ascending order. For $v_{1l}=v_{2k}$, only one value is merged in the resultant sequence.

Step 4: Using the sequence $\{v_{12j}\}$, a sequence $\{v_j\}$ of the parameter values of the division points on the first and second curves $C_1-C_2$ is obtained as follows.

First, points $P_{1j}(v_{12j})$ on the curve $C_1$ each having an element $v_{12j}$ of the sequence $\{_{12j}\}$ as a v parameter value thereof and points $P_{1j-1}(0, v_{12j-1})$ on the curve $C_1$ each having an element $v_{12j-1}$ as a v parameter value thereof are determined, and then a portion $\overline{P_{1j-1}P_{1j}}$ of the curve $C_1$ between the points $P_{1j}(0, v_{12j})$ and $P_{1j-1}(0, v_{12j-1})$ is equally divided into N parts. Similarly, a portion $\overline{P_{2j-1}P_{2j}}$ of the curve $C_2$ between points $P_{2j}(1, v_{12j})$ on the curve $C_2$ each having an element $v_{12j}$ as a v parameter value thereof and points $P_{2j-1}(1, v_{12j-1})$ on the curve $C_2$ each having an element $v_{12j-1}$ as a v parameter value thereof is equally divided into N parts. The value N is obtained as follows. First, several points of the portion $\overline{P_{1j-1}P_{1j}}$ on the curve $C_1$ are sampled, and the curvature of the curve $C_1$ is calculated for each point, where the maximum value of the resultant curvature values is determined as $k_1$. Similarly, the maximum value of the curvature values obtained for the portion $\overline{P_{2j-1}P_{2j}}$ on the curve $C_2$ is determined as $k_2$. The greater one of the $k_1$ and $k_2$ is assumed to be k. Connecting with a broken line the division points obtained by dividing the portion $\overline{P_{1j-1}P_{1j}}$ of the curve $C_1$ into N equal parts, the value of N is determined so that the difference between piecewise linear curve and an arc having a radius of 1/k and passing the points $P_{1j-1}$ and $P_{1j}$ does not exceed a limit value $\epsilon$ specified from the keyboard 1 or the like in advance. Moreover, the value N is determined to satisfy the condition with respect to the limit value $\epsilon$ also for the portion $\overline{P_{2j-1}P_{2j}}$ of the curve $C_2$.

As described above, a sequence of v parameter values corresponding to the points obtained by dividing a portion of $C_1$ and a sequence of v parameter values corresponding to the points obtained by dividing a portion of $C_2$ are merged in the same manner as the steps 1-3 to generate a sequence $(v_j')$ in which the elements are arranged in the ascending order, and then this sequence is merged with the sequence $\{v_{12j}\}$ obtained in the step 3 to generate a sequence in which the elements are arranged in the ascending order.

The division is thus completed for the elements of the sequences $v_{j-1}$ and $v_j$. This operation is executed for the other value of j to generate the final sequence $\{v_j\}$ $(0 \leq j \leq m)$. By determining the division points as described above, the v parameter value series $\{v_j\}$ including the number of elements enough to generate a smooth surface can be obtained.

Step 5: The U parameter values series $\{u_i\}$ is also obtained for the characteristic curve $C_3$ or characteristic curves $C_3$ and $C_4$ in the same manner. That is, if two characteristic curves $C_3-C_4$ are inputted in advance, the value series $\{u_i\}$ $(0 \leq i \leq n)$ is obtained in the same fashion as the steps 1-4.

If only the characteristic curve $C_3$ is inputted in advance, the steps 2-3 are skipped in the generation of the value seris $\{u_i\}$, and the maximum curvature value obtained for the curve $C_3$ is used as k in the step 4.

Generation of intermediate curves (step 103)

In this step, using the v parameter value series $\{v_j\}$ thus generated, intermediate curves $Q_j$ connecting the associated points $P_{1j}(0, v_j)$ and $P_{2j}(1, v_j)$ on the curves $C_1$ and $C_2$ having the v parameter values $v_j$ are generated for each parameter value $v_j$, which is accomplished by use of a method characteristic to the present invention. The processing will be described with reference to the flowchart of FIG. 5 and FIG. 6.

Figure 5:
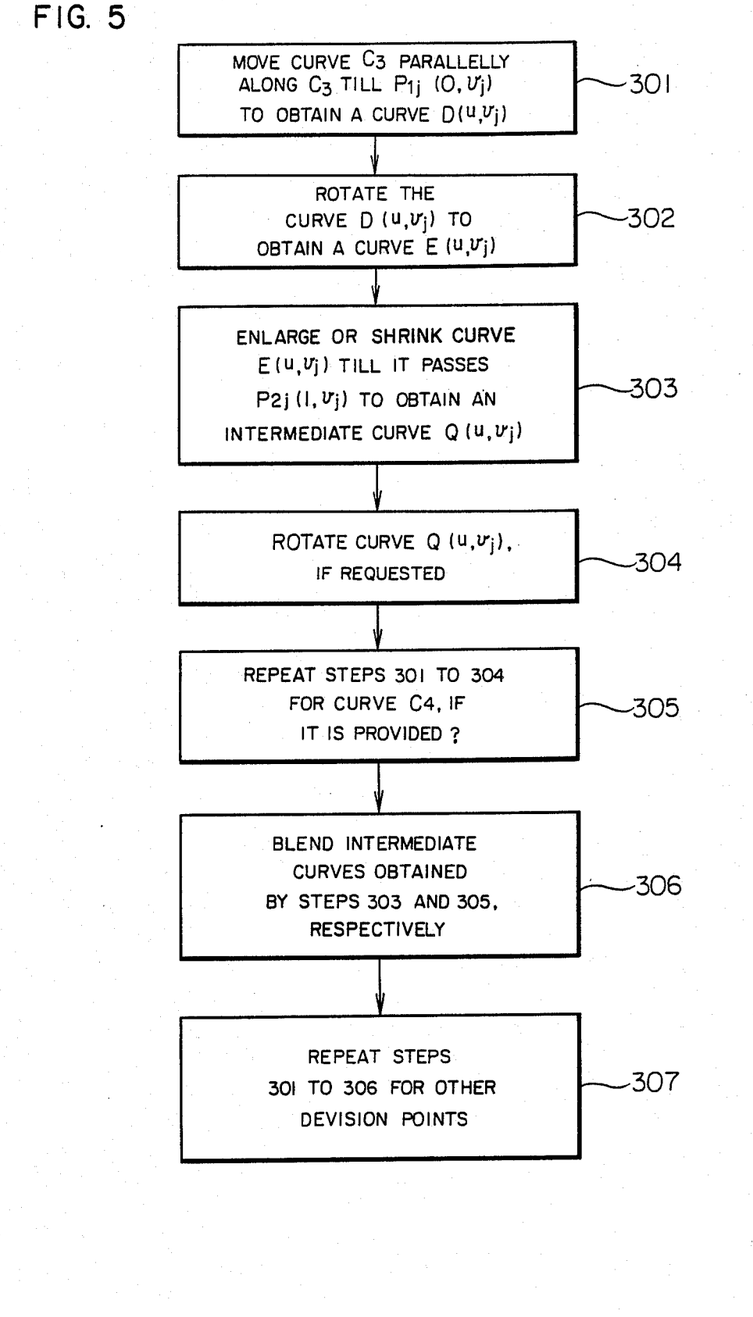
FIG. 5 is a flowchart of an intermediate curve generate processing (step 103) in the flowchart of FIG. 3.
Figure 6:
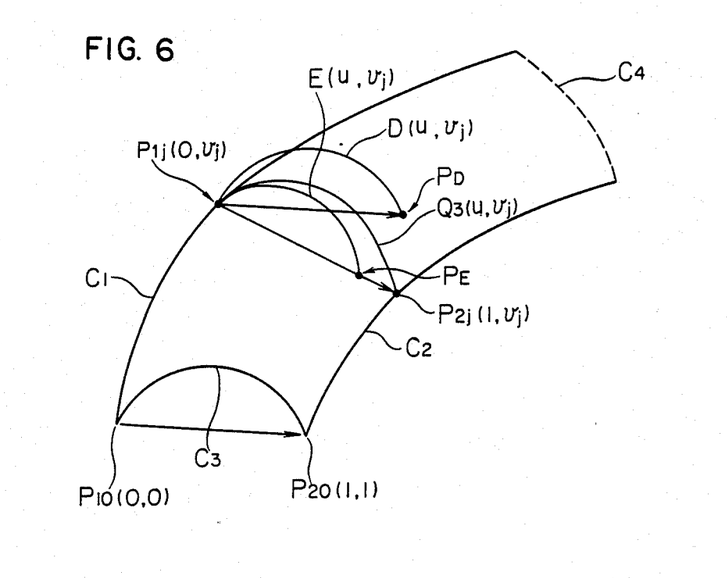
FIG. 6 is a schematic diagram depicting various curves to be generated by the time when an intermediate curve is generated according to the flowchart of FIG. 5.

(1) The characteristic curve $C_3$ is parallelly moved so that an end $P_{10}(0,0)$ is moved to a division point $P_{1j}(0, v_j)$ on the curve $C_1$, thereby generating a curve $D_j(u, v_j)$ (step 301).

(2) The curve $D(u, v_j)$ is rotated so that a vector $P_{1j}$-$P_D$ from the division point $P_{1j}(0, v_j)$ to the end $P_D$ of the curve $D(u, v_j)$ has the same direction as that of a vector $P_{1j}$-$P_{2j}$ between the division points $P_{1j}(o, v_j)$ and $P_{2j}(1, v_j)$, thereby generating a curve $E(u, v_j)$. This rotation is effected about an axis of a straight line which is orthogonal to the plane including the vectors $P_{1j}$-$P_D$ and $P_{1j}$-$P_{2j}$ and which passes the point $P_{1j}$ (step 302).

(3) The curve $E(u, v_j)$ is enlarged or shrinked with the point $P_{1j}(0, v_j)$ set as the center of the operation so that the end point $P_E$ of the curve $E(u, v_j)$ matches the division point $P_{2j}(1, v_j)$ on the curve $C_2$, thereby generating an intermediate curve $Q_3(u, v_j)$ (step 303).

The parallel displacement in the step 301, the rotation in the step 302, and the enlargement or shrinkage in the step 303 belong to the affine transformation. Consequently, the intermediate curve $Q_3(u, v_j)$ is considered to be obtained by conducting the affine transformation on the characteristic curve $C_3$.

If the characteristic curve $C_4$ is not beforehand inputted, the intermediate curve $Q_3(u, v_j)$ thus obtained is one of the objective intermediate curves. In this case, since the intermediate curve is obtained by use of the affine transformation, the undulation due to the effect of the weight function as appeared in the conventional technique is not caused in the intermediate curve $Q_3(u, v_j)$. Depending on the form of the surface to be generated, namely, the forms of the control curves $C_1-C_2$ and characteristic curve $C_3$ or characteristic curves $C_3-C_4$, the rotation processing 304 is desirably effected on the generated intermediate curve $Q_3(u,v)$. This processing is executed in response to an operator's instruction inputted from the keyboard 1. The details of the rotation processing will be described later. If the characteristic curve $C_4$ is beforehand inputted, like in the case of the characteristic curve $C_3$, an intermediate curve called $Q_4(u, v_j)$ passing the division points $P_{1j}(0, v_j)$ and $P_{2j}(1, v_j)$ is generated by use of the characteristic curve $C_4$ (step 305).

Figures 7, 8:
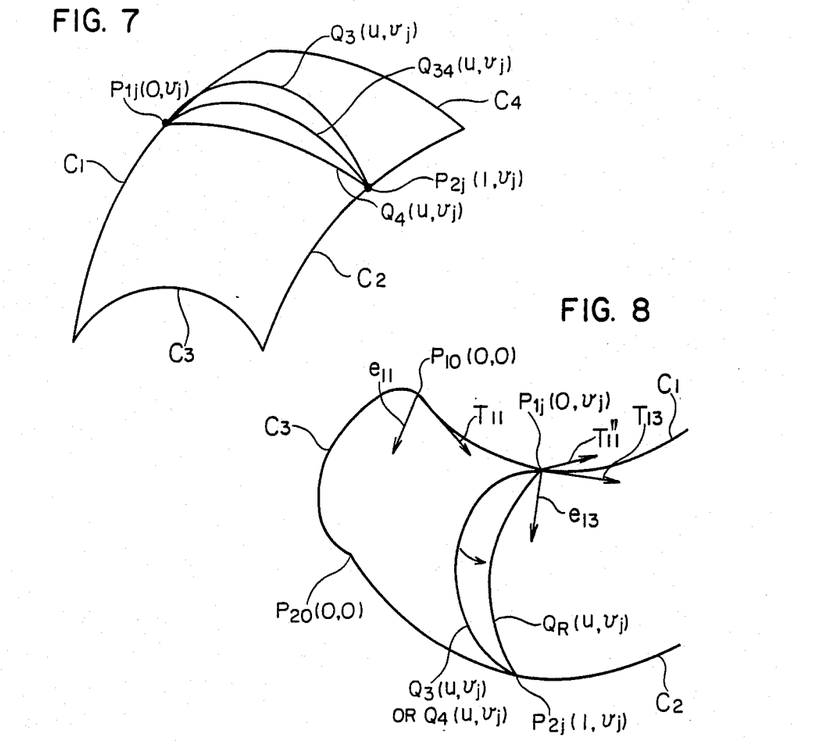
FIG. 7 is a diagram illustrating two intermediate curves generated for the blend operation according to the flowchart of FIG. 5 and an intermediate curve obtained by blending the two intermediate curves.
FIG. 8 is a diagram showing an intermediate curve attained by the rotation conducted according to the processing (step 304) of FIG. 5.

FIG. 7 is a schematic diagram instantiating an intermediate curve $Q_4(u, v_j)$ thus generated and an intermediate curve $Q_3(u, v_j)$ generated in advance.

The intermediate curves $Q_3(u, v_j)$ and $Q_4(u, v_j)$ are blended as follows to generate the final intermediate curve $Q_{34}(u, v_j)$ (step 306).

$$Q_{34}(u, v_j) = (1 - \phi(v_j))Q_3(u, v_j) + \phi(v_j)Q_4(u, v_j)$$

where, $\phi(t)$ is a blending function that satisfies the conditions: $\phi(0)=0$, $\phi(1)=1$, and $0 \leq \phi(t) \leq 1$. More concretely, this function is either one of $$\phi(t) = t$$

$$\phi(t) = -2t^3 + 3t^2$$

$$\phi(t) = 6t^5 - 15t^4 + 10t^3.$$

The intermediate curve $Q_{34}(u,v_j)$ generated in this system matches the first characteristic curve $C_3$ for $v = v_0 (=0)$ and matches the second characteristic curve $C_4$ for $v = v_n (=1)$; consequently, the intermediate curve $Q_{34}(u,v_j)$ smoothly changes from the curve $C_3$ to the curve $C_4$ as the value of $v_j$ changes.

As described above, even when both characteristic curves $C_3$–$C_4$ are beforehand inputted, the intermediate curves not having the undulation are blended by use of the affine transformation, which minimizes the undulation as compared with the prior art system, and hence this system can be practically used without causing any problems.

Next, referring to FIG. 8, the rotation in step 304 will be described. The following various rotations are executed in response to an operator's instruction. All these operations are effected about an axis connecting two division points $P_{1j}(0,v_j)$ and $P_{2j}(1,v_j)$ on the curves $C_1$ and $C_2$, respectively.

In FIG. 2, the curve segment $C_{12}$ of the control curve $C_1$ is subjected to the rotation, whereas the curve segment $C_{11}$ is not subjected to the rotation. As can be seen from this example, the rotation is achieved to generate a torus type surface. The amount of rotation is determined by the amount of the rotation of the tangent vector of the control curve about the axis connecting the points $P_{1j}(0,v_j)$ and $P_{2j}(1,v_j)$. The rotation is conducted in one of three modes, namely, rotation modes 1, 2, and 3. In the rotation mode 1, the rotation is determined by the rotation amount of the tangent vector of the first control curve; in the rotation mode 2, the rotation is determined by the rotation amount of the tangent vector of the second control curve; and in the rotation mode 3, the rotation is determined by the rotation amount of the vector obtained by adding the two tangent vectors. One of the operation modes is selected in response to an operator's request according to a curve to be displayed.

In FIG. 8, $T_{11}$ and $T_{13}$ represent the tangent vectors at the end point $P_{10}(0,0)$ and the division point $P_{1j}(0,v_j)$, respectively on the curve $C_1$; whereas $e_{11}$ and $e_{13}$ are the unit vectors of the vectors $P_{20}(1,0) - P_{10}(0,0)$ and $P_{2j}(1,v_j) - P_{1j}(0,v_j)$, respectively.

Rotation mode 1

Among the component vectors of the tangent vector at the first end point of the curve $C_1$, a component vector orthogonal to the vector from the first end point of $C_1$ to the first end point of $C_2$ is rotated so as to overlap a component vector of the tangent vector at each division point on the curve $C_1$ which is orthogonal to the vector drawn from the division point to an associated division point on the curve $C_2$.

First, the component vectors $T_{11}'$ and $T_{13}'$ orthogonal to the unit vector $e_{11}$ and $e_{13}$ of the tangent vectors $T_{11}$ and $T_{13}$ are determined from the following expressions.

$$T_{11}' = T_{11} - \langle T_{11}, e_{11} \rangle e_{11}$$

$$T_{13}' = T_{13} - \langle T_{13}, e_{13} \rangle e_{13}$$

where, $\langle , \rangle$ is a scalar product of the vectors and $\overline{X}$ indicates a unit vector of X. For the vector $T_{11}$, the unit vector $e_{11}$ is rotated so as to overlap the unit vector $e_{13}$, thereby obtaining a vector $T_{11}''$. This rotation is the same as that effected in the step 302. For the intermediate curve $Q_3$ (or $Q_4$), the vector $T_{11}''$ is rotated to overlap the vector $T_{13}'$, thereby generating an intermediate curve $Q_R(u,v)$.

Rotation mode 2

The rotation in this mode is determined by the rotation amount of the tangent vector of the second control curve. Among the component vectors of the tangent vector at the first end point of the curve $C_2$, a component vector orthogonal to the vector from the first end point of the curve $C_1$ to the first end point of the curve $C_2$ is rotated to overlap a component vector of the tangent vector at each division point on the curve $C_2$ which is orthogonal to the vector from the division point on the curve $C_2$ to an associated division point on the curve $C_1$. That is, in place of the tangent vectors $T_{11}$ and $T_{13}$ of the curve $C_1$ in the rotation mode 1, the tangent vector $T_{21}$ and $T_{23}$ of the curve $C_2$ are used for the rotation in this mode.

Rotation mode 3

The rotation is determined by the vector obtained by adding the tangent vectors of the first and second control curves, respectively. A component vector of the vector obtained by adding the tangent vector at the first end point of the curve $C_1$ and the tangent vector at the first end point of the curve $C_2$ which is orthogonal to the vector from the first end point of the curve $C_1$ to the first end point of the curve $C_2$ is rotated to overlap a component vector of the vector obtained by adding the tangent vector at each division point of the curve $C_1$ and the tangent vector at an associated division point of the curve $C_2$ which is orthogonal to the vector from the division point of the curve $C_1$ to the associated division point of the curve $C_2$. That is, in place of the vectors $T_{11}$ and $T_{13}$ in the rotation mode 1, the vectors $T_{11} + T_{21}$ and $T_{13} + T_{23}$ are used for the rotation in this mode. Calculation of representative point series (step 104)

Among the points on the intermediate curves obtained as described above, the points to be displayed are selected and the positions thereof are calculated as follows.

According to the present invention, among the points on the intermediate curves, those having the same parameter values as the parameter values $\{u_i\}$ of the division points on the characteristic curve are assumed to be the representative points. Consequently, the value of each element $u_i$ of the sequence of numbers $\{u_i\}$ is assigned to each intermediate curve $Q_j(u,v_j)$ to calculate the coordinate values of the representative point $P_{ij}(u_i,v_j)$. Finally, the $m+1$ positions of the representative points $P_{ij}(u_i,v_j)$ are obtained for each intermediate curve.

Display (step 105)

A piecewise linear curve connecting a plurality of representative points on each intermediate curve and a piecewise linear curve the representative points on the other intermediate curve having the same U parameter value are displayed, thereby configuring a display image of a three-dimensional surface.

Figure 9:
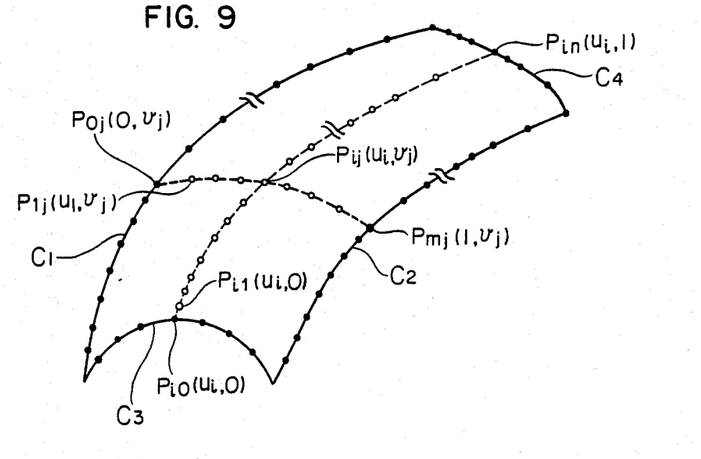
FIG. 9 is a schematic diagram depicting series of representative points generated by the processing of FIG. 3.

For this purpose, the display control program 30 (FIG. 1) generates for all values of j the series of the representative points $P_{0j}(0,v_j)$, $P_{1j}(u_1,v_j)$, ..., $P_{mj}(1,v_j)$ existing on the respective intermediate curves. Furthermore, for the parameter value $u_i$ of each division point on the first characteristic curve $C_3$, the series of the representative points on the other intermediate curve, namely, $P_i(u_i,0)$, $P_{i1}(u_i,0)$, ..., $P_{in}(u_i, 1)$ are generated. FIG. 9 is a schematic diagram instantiating such representative point series. In order to display the representative points on the two-dimensional display screen, the representative points are projected onto a specified two-dimensional plane to generate a converted point series. The resultant point series obtained through the projection is transmitted to the graphic controller 4 (FIG. 1), which in turn generates data to display the piecewise linear curve associated with the inputted point series.

The graphic image of FIG. 2 is thus generated and displayed.

Deformation of surface (step 107)

Figure 10:
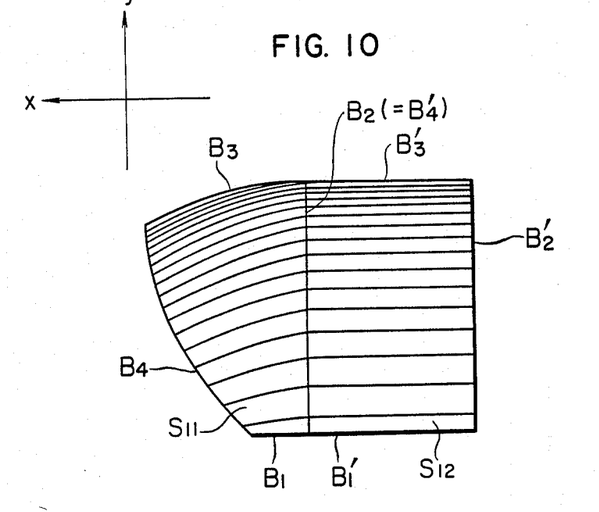
FIG. 10 is a diagram depicting two surfaces to be deformed.

FIG. 10 is a schematic diagram of the cross sectional curves obtained as follows. The representative points of the surface generated according to the surface generating system described above are subjected to the interpolation by spline surface and the cross sectional curves are obtained as the intersections between the resultant surface and the planes parallel to the X-Y plane. Assume that $B_1$ to $B_4$ and $B_1'$ to $B_4'$ are the boundaries of $S_{11}$ and $S_{12}$, respectively. In the $S_{11}$ and $S_{12}$, $B_1$ and $B_3$ are smoothly connected to $B_1'$ and $B_3'$, respectively; whereas, the smooth connection is not established along the direction crossing the curve $B_2(=B_4')$. This phenomenon is caused because the rotation is conducted when the intermediate curves are generated as described above. Although there may exist a case where surfaces need not be smoothly connected to each other, the surfaces are generally required to be smoothly connected also on the curve $B_2(=B_4')$ in such an example of FIG. 10. To overcome this difficulty, the surface $S_{11}$ is deformed so that the surfaces $S_{11}$ and $S_{12}$ are smoothly connected.

Figure 11:
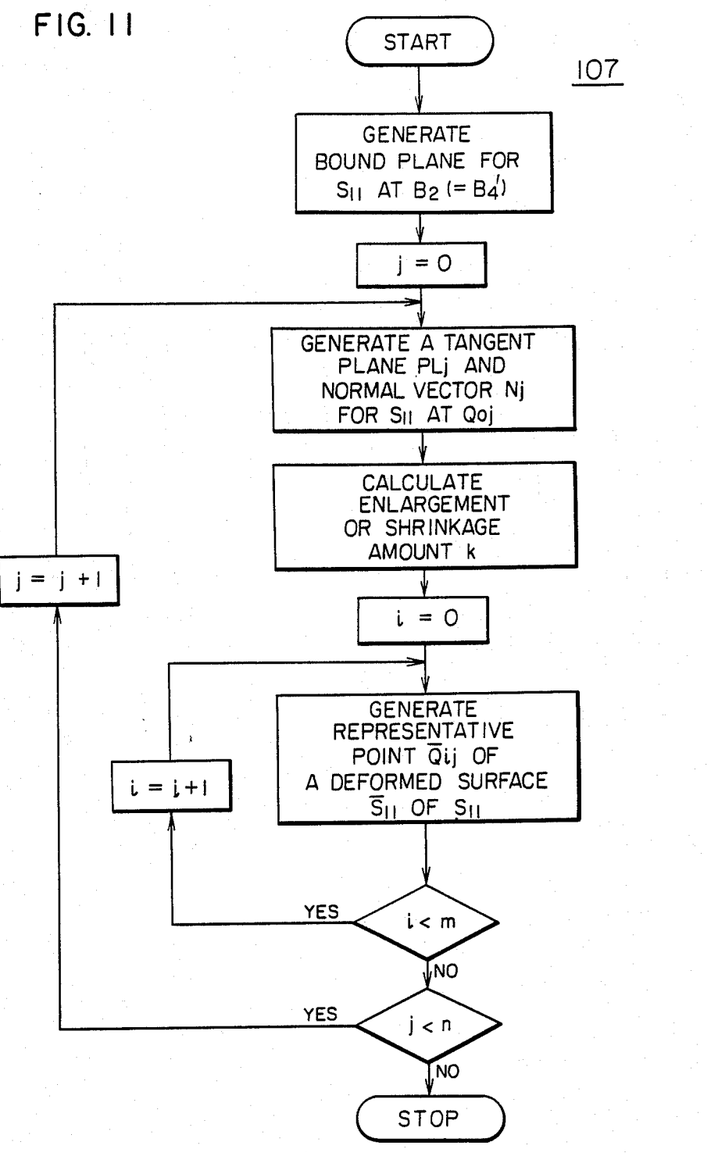
FIG. 11 is a simplified flowchart of the surface deform processing (step 107) of FIG. 3.

FIG. 11 is a flowchart for explaining the deform processing of the surface $S_{11}$.

First of all, a plane bounding $S_{11}$ on $B_2(=B_4')$ is generated.

Figure 12:
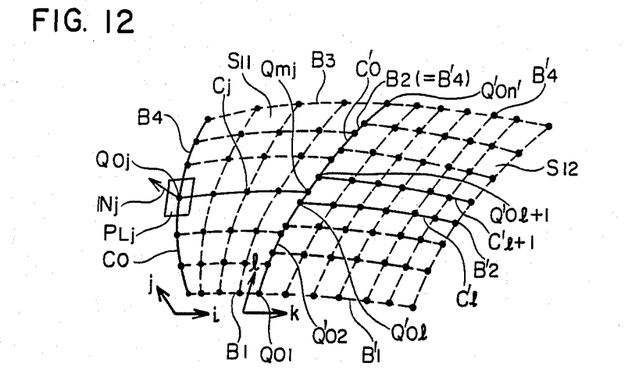
FIG. 12 is a schematic diagram showing representative points on two surfaces to be deformed according to the flowchart of FIG. 11.
Figure 13:
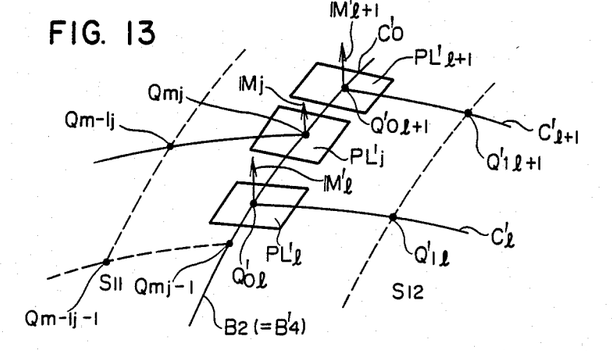
FIG. 13 is a magnified diagram of a portion of FIG. 12.

FIG. 12 is a schematic diagram for explaining the method for generating the plane bounding $S_{11}$, whereas FIG. 13 is a magnified diagram of a portion of FIG. 12. In the diagram, $\{Q_{ij}\}$ $0 \leq i \leq m$, $t \leq j \leq u$ and $\{Q'_{kl}\}$ $0 \leq k \leq m'$, $0 \leq l \leq n'$ are the representative points of $S_{11}$ and $S_{12}$, respectively generated according to the surface generating system, whereas $B_1$ to $B_4$ and $B_1'$ to $B_4'$ are the boundaries of $S_{11}$ and $S_{12}$, respectively as described above.

The plane bounding $S_{11}$ on $B_2$ is a plane which is tangent to a plane $S'_n$ obtained by deforming $S_{11}$ on the curve $B_2$. In FIG. 12, a plane $PL_j$ bounds the surface $S_{11}$. A boundary plane $PL'_j$ for $Q_{mj}$ is obtained as follows.

Step 1: A spline curve $C_o'$ passing the representative points $Q'_{o1}, Q'_{o2}, \ldots, Q'_{on}$ of $S_{12}$ on the boundary $B_4'$ is generated.

Step 2: From the representative points $Q'_{o1}, Q'_{o2}, \ldots, Q'_{on}$, two points $Q'_{ol}$ and $Q'_{ol+1}$ enclosing $Q_{mj}$ are selected.

Step 3: A spline curve $C'_l$ passing $Q'_{ol}, Q'_{1l}, \ldots, Q'_{m'l}$ and a spline curve $C'_{l+1}$ passing $Q'_{0M+1}, Q'_{1l+1}, \ldots, R'_{mM+1}$ are generated.

Step 4: A tangent plane $PL_l'$ touching $C_o'$ and $C_l'$ at $Q'_{ol}$ and a tangent plane $PL'_{l+1}$ touching $C_0'$ and $C'_{l+1}$ at $Q'_{ol+1}$ are generated, and then normal unit vectors thereof $M'_l$ and $M'_{l+1}$ are obtained.

Step 5: Distance $d_1$ between $Q'_{ol}$ and $Q_{mj}$ and distance $d_2$ between $Q'_{ol+1}$ and $Q_{mj}$ are calculated.

Step 6: The plane bounding $S_{11}$ at $Q_{mj}$ is determined as a plane $PL_j'$ orthogonal to $$M_j' = \frac{1}{d_1 + d_2}(d_1 M'_{l+1} + d_2 M'_l)$$

The boundary plane for $S_n$ is thus obtained.

Next, a spline curve $C_0$ passing the representative points $Q_{o1}, Q_{o2}, \ldots, Q_{on}$ on the boundary $B_4$ and a spline curve $C_j$ passing $Q_{0j}, Q_{1j}, \ldots, Q_{mj}$ are generated, and then a tangent plane $PL_j$ touching $C_o$ and $C_j$ on $Q_{0j}$ and a normal unit vector $N_j$ are obtained.

Figure 14:
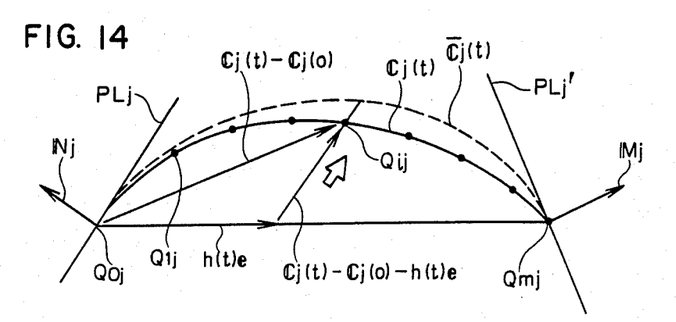
FIG. 14 is a schematic diagram showing intermediate curves before and after the curve deform processing in accordance with the flowchart of FIG. 11.

While keeping $C_j$ being tangent to $PL_j$ on $P_{0j}$, the program deforms the spline curve $C_j$ so as to touch on $Q_{mj}$ the plane $PL'_j$ calculated in advance. FIG. 14 is a schematic diagram for explaining the deformation processing. For deforming $C_j$ to touch $PL_j'$ while $C_j$ is kept to be tangent to $PL_j$, the spline curve $C_j$ is enlarged or shrinked in a direction parallel to $PL_j$ as indicated by the arrowed lines in FIG. 14, thereby generating a curve $\overline{C_j}$. The amount of the enlargement or shrinkage is calculated as follows. Assume $\mathbb{C}_j(t)$ ($0 \leq t \leq 1$) is a vector expression of $C_j$ and determine the parameter t so that the start and end points of $C_j$ matches $Q_{0j}$ and $Q_{mj}$, respectively. Decompose $\mathbb{C}_j(t) - \mathbb{C}_j(o)$ into a vector component drawn from $Q_{0j}$ to $Q_{mj}$ and a vector component parallel to the plane $PL_j$. Assuming a unit vector from $Q_{0j}$ to $Q_{mj}$ to be $\mathbf{e}$ $$\mathbb{C}_j(t) - \mathbb{C}_j(o) = h(t)\mathbf{e} + (\mathbb{C}_j(t) - \mathbb{C}_j(o) - h(t)\mathbf{e}) \qquad \text{①}$$

is obtained, where the first term of the right side is the vector component from $Q_{0j}$ to $Q_{mj}$ and the second term is the vector component parallel to the plane $PL_j$, and $$h(t) = \frac{\langle (\mathbb{C}_j(t) - \mathbb{C}_j(o)), lN_j \rangle}{\langle \mathbf{e}, lN_j \rangle} \qquad \text{②}$$

In this expression, $\langle, \rangle$ indicate a scalar product of the vectors. In addition, since the curve $\overline{\mathbb{C}}_j(t)$ obtained by enlarging or shrinking $\mathbb{C}_j(t)$ in the arrowed direction in FIG. 14 is obtained by multiplying the second term of the expression ② by a constant, the following expression is obtained by use of a contant k.

$$\overline{\mathbb{C}}_j(t) - \mathbb{C}_j(o) = h(t)\mathbf{e} + k(\mathbb{C}_j(t) - \mathbb{C}_j(o) - h(t)\mathbf{e}) \qquad \text{③}$$

If the curve $\overline{\mathbb{C}}_j(t)$ touches $PL'_j$ on $Q_{mj}$, the tangent vector of $\overline{\mathbb{C}}_j(t)$ at $Q_{mj}$ is orthogonal to $M'_j$, consequently, the constant k need only be determined as follows.

$$k = \left(1 - \frac{\langle \mathbb{C}_j'(1), lM_j \rangle \cdot \langle \mathbf{e}, lN_j \rangle}{\langle \mathbb{C}_j'(1), lN_j \rangle \cdot \langle \mathbf{e}, lM_j \rangle}\right)^{-1} \qquad \text{④}$$

where, $\mathbb{C}'_j(1)$ is a tangent vector for $t=1$.

Based on the amount of enlargement or shrinkage thus calculated, the point series $\{\overline{Q}_{ij}\}$ $0 \leq i \leq m$ is generated by deforming $\{Q_{ij}\}$ $0 \leq i \leq m$.

Assume that the position vectors of $Q_{ij}$ and $\overline{Q}_{ij}$ are represented as $\mathcal{Q}_{ij}$ and $\overline{\mathcal{Q}}_{ij}$, respectively; then $$\overline{\mathcal{Q}}_{ij} = \mathcal{Q}_{ij} \text{ for } i=0 \text{ or } i=m \quad (5)$$

$$\overline{\mathcal{Q}}_{ij} = \mathcal{Q}_{oj} + h_i e + k(\mathcal{Q}_{ij} - \mathcal{Q}_{oj} - h_i e) \text{ for } o < i < m \quad (6)$$

are obtained. In the expression (6), $h_i$ is an amount corresponding to the expression (2), namely, $$h_i = <(\mathcal{Q}_{ij} - \mathcal{Q}_{oj}), lN_j> <e, lN_j> \quad (7)$$

This procedure is repeatedly effected from $j=0$ to $j=m$, thereby generating the representative point series $\{\overline{\mathcal{Q}}_{ij}\}$ $0 \leq i \leq m$, $0 \leq j \leq n$ of the surface $\overline{S}_{11}$ obtained by deforming $S_{11}$.

Figure 15:
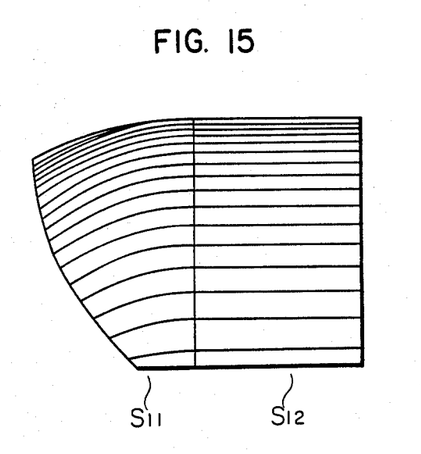
FIG. 15 is a diagram illustrating a graphic image generated by the curve deform processing of FIG. 3.

FIG. 15 is a schematic diagram of an example where $S_{11}$ of FIG. 10 is deformed to generate a surface $\overline{S}_{11}$ which is smoothly connected to $S_{12}$.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A three-dimensional surface display method using a computer, said method comprising the following steps of:
    (a) calculating, based on input data of a first curve and input data of a second curve representing a first edge and a second edge opposed to the first edge, respectively, of a three-dimensional surface to be displayed, positions of division points of a first kind and a second kind, respectively, which belong to said first curve and said second curve, respectively;
    (b) calculating positions of division points of a third kind, said points belonging to a third input curve representing a third edge that belongs to a surface to be generated and connects said first edge to said second edge;
    (c) calculating, for each pair of division points having first and second kinds, an intermediate curve which is formed by passing each pair through the following steps of;
        (c1) calculating a curve obtained by parallely moving said third curve so that an end of said third curve passes the division point of the first kind of each pair;
        (c2) calculating a curve obtained by rotating said parallely moved curve third curve, without moving the end thereof, so that another end of said connecting said division point of the first kind and the division point of the second kind of each pair; and
        (c3) calculating, as an intermediate curve connecting each pair of the division points of the first kind and of the second kind, a curve obtained by enlarging or shrinking said rotated curve third curve, without moving the end thereof, so that the other end thereof matches the division point of the second kind of each pair;
    (d) calculating positions of representative points on each calculated intermediate curve, said representative points corresponding to respective division points of the third kind on said third curve so as to provide calculated positions of representative points on each intermediate curve as data representative of the surface to be generated;
    (e) calculating plural piece-wise linear curves by connecting said representative points both in the direction of said intermediate curve and in the perpendicular direction of said intermediate curve; and
    (f) displaying said plural piece-wise linear curves on a screen of a graphic display terminal.

2. A three-dimensional surface display method according to claim 1 wherein:
    said first curve, said second curve, and said third curve each are inputted as a function of a first parameter and a second parameter each being set to a value in an interval;
    values of the first parameters of said first and second curves are 0 and 1 respectively;
    the second parameter of said third curve is set to zero;
    the division points of the first and second kinds existing on the first and second curves, respectively and opposing to each other are the points each having a same value of the second parameter;
    the curve obtained by parallely moving the third curve to a position passing each said division point of the first kind, the curve obtained by rotating the curve undergone the parallel displacement, and the curve obtained by the homothetic transformation of the rotated curve are each calculated as a function of the first parameter; and
    said representative points are determined by a value of the first parameter for each said plurality of division points on the third curve and a value of the second parameter for a division point on the first curve, each said representative point existing on said intermediate curve passing said division points on said first and second curves.

3. A three-dimensional surfaces display method according to claim 1 wherein:
    said rotation is effected about an axis which is orthogonal to a plane including a straight line connecting both end points of a curve obtained by parallely moving said third curve so as to pass each said division point of the first kind and including a division point of the second kind corresponding to each said division point of the first kind and said axis passes each said division point of the first kind.

4. A three-dimensional surface display method according to claim 1 further comprising the steps of:
    calculating, after said step (c) is executed, a new curve obtained by rotating the intermediate curve calculated for said division point pair about a straight line passing a pair of the corresponding division points of the first and second kinds, respectively; and
    effecting said step (d) by using as the intermediate curve said new curve in place of the intermediate curve not rotated.

5. A three-dimensional surface display method according to claim 4 wherein:
    said rotation effected for said intermediate curve causes a first vector to overlap a second vector;
    said first vector is selected from component vectors of a tangent vector on said first curve at a starting point thereof, said first vector being a component vector having a direction orthogonal to a vector drawn from said starting point of said first curve to a starting point of said second curve; and said second vector is selected from component vectors of a tangent vector on said first curve at each said division point of the first kind, said second vector being a component vector having a direction orthogonal to a vector drawn from said division point of the first kind to an associated division point of the second kind.

6. A three-dimensional surface display method according to claim 4 wherein:

said rotation effected for said intermediate curve causes a first vector to overlap a second vector;

said first vector is selected from component vectors of a tangent vector on said second curve at a starting point thereof, said first vector being a component vector having a direction orthogonal to a vector drawn from the starting point of said first curve to the starting point of said second curve; and said second vector is selected from component vectors of a tangent vector on said second curve at each said division point of the second kind, said second vector being a component vector having a direction orthogonal to a vector drawn from said division point of the second kind to an associated division point of the first kind.

7. A three-dimensional surface display method according to claim 4 wherein:

said rotation effected on said intermediate curve causes the first vector to overlap a second vector;

said first vector is selected from component vectors of a vector obtained by adding a tangent vector on said first curve at a starting point thereof and a tangent vector on said second curve at a starting point thereof, said first vector being a component vector having a direction orthogonal to a straight line drawn from the starting point of the first curve to the first point of the second curve; and said second vector is selected from component vectors of a vector obtained by adding a tangent vector on said first curve at each said division point of the first kind and a tangent vector on said second curve at a division point of the second kind corresponding to said division point of the first kind, said second vector being a component vector having a direction orthogonal to a straight line drawn from said division point of the first kind to an associated division point of the second kind.

8. A three-dimensional surface display method according to claim 1 further comprising the steps of:

determining division points of a fourth kind on a fourth curve inputted to represent a fourth edge opposing to said third edge of the three-dimensional surface to be displayed, said division points of the fourth kind corresponding to the division points of the third kind, respectively on said third curve;

executing, after said step (c) is effected, the processing of the step (c) for the fourth curve and the division points of the fourth kind, thereby calculating a plurality of intermediate curves;

effecting a weighted blending operation for an intermediate curve calculated for each division point of the first kind by use of said step (c) based on said third curve and for an intermediate curve calculated for each division point of the first kind by use of said step (c) based on said fourth curve, thereby obtaining a new intermediate curve for each said division point of the first kind; and executing thereafter said steps (d) and (e) based on the new intermediate curve.

9. A three-dimensional surface display method according to claim 1 further comprising the steps of:

(g) executing said steps (a)–(d) for a first surface and a second surface which are to be displayed together and share an edge, thereby obtaining intermediate curves each passing one of division points on the shared edge;

(h) deforming one of first intermediate curves obtained for the first surface by said step (g), so that the one first intermediate curve touches a first tangent plane at a division point on the shared edge through which said one first intermediate curve passes, said first tangent plane being predetermined so as to touch the shared edge and one of second intermediate curves obtained for the second surface by the step (g), said one first intermediate curve being between two neighboring second intermediate curves; and (i) effecting said step (h) on the remaining first intermediate curves obtained for the first surface.

10. A three dimensional surface display method according to claim 9, wherein said step (h) includes the step of enlarging or shrinking the one first intermediate curve by enlarging or shrinking respective distances between respective representative points on the one first intermediate curve and corresponding points with a ratio required to make the one first intermediate curve touch said first tangent plane of step (h), each of said corresponding points being a cross point of a plane and a straight line, said plane including each representative point on the one first intermediate curve and being parallel to a second tangent plane which touches the one first intermediate curve and an edge of the first curve opposing to the shared edge at a division point on the opposing edge through which the one first intermediate curve passes, said straight line connecting the division point of the first curve on the opposing edge and a division point on the shared edge through which the one first intermediate curve passes.

11. A three-dimensional surface generation method comprising the following steps of:

(a) calculating, based on input data of a first curve and input data of a second curve representing a first edge and a second edge opposed to the first edge, respectively, of a three-dimensional surface to be displayed, positions of division points of a first kind and a second kind, respectively, which belong to said first curve and said second curve, respectively;

(b) calculating positions of division points of a third kind, said points belonging to a third input curve representing a third edge that belongs to the surface to generated and connects said first edge to said second edge;

(c) calculating, for each of pairs of the division points of the first and second kinds, an intermediate curve which is formed by passing each pair through the following steps of;

(c1) calculating a curve obtained by parallely moving said third curve so that an end of said parallely moved third curve passes the division point of the first kind of each pair;

(c2) calculating a curve obtained by rotating said parallely moved curve, without moving the end, so that an opposing end thereof is located on a straight line connecting said division point of the first kind and the division point of the second kind of each pair; and (c3) calculating, as an intermediate curve connecting each pair of the division points of the first kind and of the second kind, a curve obtained by enlarging or shrinking said rotated curve, without moving the end, so that said opposing end thereof matched the division point of the second kind of each pair; and (d) calculating positions of representative points on each said calculated intermediate curve, said representative points corresponding to respective division points of the third kind on said third curve, so as to provide the calculated positions of the representative points on each intermediate curve as data representative of the surface to be generated.

12. A three-dimensional surface generation method according to claim 11 wherein:
said first curve, said second curve, and said third curve each are inputted as a function of a first parameter and a second parameter each being set to a value in an interval;
values of the first parameters of said first and second curves are 0 and 1, respectively;
the second parameter of said third curve is set to zero;
the division points of the first and second kinds existing on the first and second curves, respectively, and opposing each other are the points each having a same value of the second parameter;
the curve obtained by parallely moving the third curve to a position passing each said division point of the first kind, the curve obtained by rotating the curve which has undergone the parallel displacement, and the curve obtained by the hemothetic transformation of the rotated curve are each calculated as a function of the first parameter; and
said representative points are determined by a value of the first parameter for each said plurality of division points on the third curve and a value of the second parameter for a division point on the first curve, each said representative point existing on said intermediate curve of step (c) passing said division points of said first and second curves each having the same value as said second parameter.

13. A three-dimensional surface generation method according to claim 11 wherein:
said rotation is effected about an axis which is orthogonal to a plane including a straight line connecting both end points of a curve obtained by parallely moving the third curve so as to pass each said division point of the first kind and including a division point of the second kind corresponding to each said division point of the first kind and said axis passes each said division point of the first kind.

14. A three-dimensional surface generation method according to claim 11 further comprising the steps of:
calculating, after said step (c) is executed, a new curve obtained by rotating the intermediate curve calculated for said division point pair about a straight line passing a pair of the corresponding division points of the first and second kinds, respectively; and
effecting said step (d) by using as the intermediate curve the new curve in place of the intermediate curve not rotated.

15. A three-dimensional surface generation method according to claim 14 wherein:
said rotation effected for said intermediate curve causes a first vector to overlap a second vector;
said first vector is selected from component vectors of a tangent vector on said first curve at a starting point thereof, said first vector being a component vector having a direction orthogonal to a vector drawn from said starting point of said first curve to a starting point of said second curve; and
said second vector is selected from component vectors of a tangent vector on said first curve at each said division point of the first kind, said second vector being a component vector having a direction orthogonal to a vector drawn from said division point of the first kind to an associated division point of the second kind.

16. A three-dimensional surface generation method according to claim 14 wherein:
said rotation effected for said intermediate curve causes a first vector to overlap a second vector;
said first vector is selected from component vectors of a tangent vector on said second curve at a starting point thereof, said first vector being a component vector having a direction orthogonal to a vector drawn from the starting point of said first curve to the starting point of said second curve; and
said second vector is selected from component vectors of a tangent vector on said second curve at each said division point of the second kind, said second vector being a component vector having a direction orthogonal to a vector drawn from said division point of the second kind to an associated division point of the first kind.

17. A three-dimensional surface generation method according to claim 14 wherein:
said rotation effected on said intermediate curve causes a first vector to overlap a second vector;
said first vector is selected from component vectors of a vector obtained by adding a tangent vector on said first curve at a starting point thereof and a tangent vector on said second curve at a starting point thereof, said first vector being a component vector having a direction orthogonal to a straight line drawn from the starting point of the first curve to the first point of the second curve; and
said second vector is selected from component vectors of a vector obtained by adding a tangent vector on said first curve at each said division point of the first kind and a tangent vector on said second curve at a division point of the second kind corresponding to said division point of the first kind, said second vector being a component vector having a direction orthogonal to a straight line drawn from said division point of the first kind to an associated division point of the second kind.

18. A three-dimensional surface generation method according to claim 11 further comprising the steps of:
determining division points of a fourth kind on a fourth curve inputted to represent a fourth edge opposing said third edge of the three-dimensional surface to be displayed, said division points of the fourth kind corresponding to the division points of the third kind, respectively, on said third curve;
executing, after said step (c) is effected, the processing of the step (c) for the fourth curve and the division points of the fourth kind, thereby calculating a plurality of intermediate curves;

effecting a weighted blending operation for an intermediate curve calculated for each division point of the first kind by use of said step (c) based on said third curve and for an intermediate curve calculated for each division point of the first kind by use of said step (c) based on said fourth curve, thereby obtaining a new intermediate curve for each said division point of the first kind; and executing thereafter said step (d) based on the new intermediate curve.

19. A three-dimensional surface generation method according to claim 11 further comprising the steps of:
(g) executing said steps (a)-(d) for a first surface and a second surface which are to be displayed together and share an edge, thereby obtaining intermediate curves each passing one of division points on the shared edge;
(h) deforming one of first intermediate curves obtained for the first surface by said step (g), so that the one first intermediate curve touches a first tangent plane at a division point on the shared edge through which said one first intermediate curve passes, said first tangent plane being predetermined so as to touch the shared edge and one of second intermediate curves obtained for the second surface by the step (g), said one first intermediate curve being between two neighboring second intermediate curves;
(i) effecting said step (h) on the remaining first intermediate curves obtained for the first surface.

20. A three-dimensional surface generation method according to claim 19, wherein said step (h) includes the step of enlarging or shrinking the one first intermediate curve by enlarging or shrinking respective distances between respective representative points on the one first intermediate curve and corresponding points with a ratio required to make the one first intermediate curve touch said first tangent plane of said step (h), each of said corresponding points being a cross point of a plane and a straight line, said plane including each representative point on the one first intermediate curve and being parallel to a second tangent plane which touches the one first intermediate curve and an edge of the first curve opposing to the shared edge at a division point on the opposing edge through which the one first intermediate curve passes, said straight line connecting the division point of the first curve on the opposing edge and a division point on the shared edge through which the one first intermediate curve passes.

* * * * *